Oct. 5, 1965 W. N. JONES 3,210,670
DEMODULATOR APPARATUS EMPLOYING A TUNNEL DIODE
Filed March 30, 1961 2 Sheets-Sheet 1

WITNESSES
John C. Healy Jr.
James F. Young

INVENTOR
Wesley N. Jones
BY Maury I. Hull
ATTORNEY

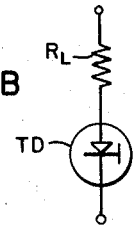
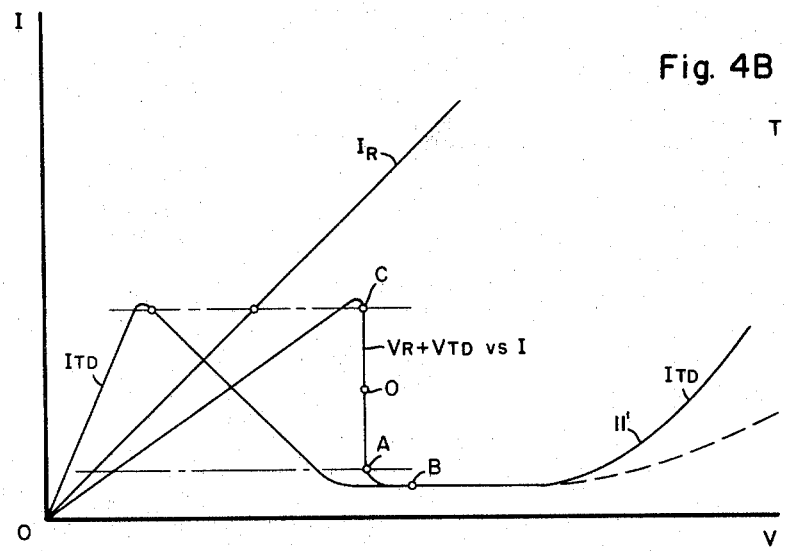
Fig. 4B
Fig. 4A
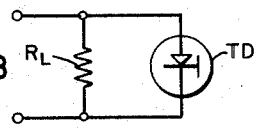
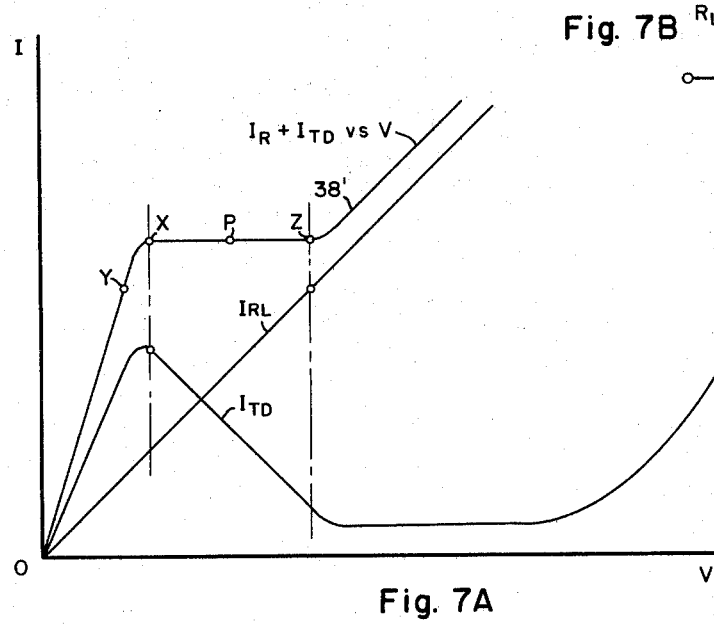
Fig. 7B
Fig. 7A

United States Patent Office 3,210,670
Patented Oct. 5, 1965

3,210,670
DEMODULATOR APPARATUS EMPLOYING A TUNNEL DIODE
Wesley N. Jones, Severna Park, Md., assignor to Westinghouse Electric Corporation, East Pittsburgh, Pa., a corporation of Pennsylvania
Filed Mar. 30, 1961, Ser. No. 99,552
3 Claims. (Cl. 329—205)

This invention relates to improvements in demodulators, and more particularly to an improved demodulator detector utilizing the non-linear voltage-current characteristics of a tunnel diode.

A primary object of the invention is to provide a new and improved detector or demodulator.

A further object is to provide a new and improved demodulator or detector employing a tunnel diode.

These and other objects will become more clearly apparent after a study of the following specification, when read in connection with the accompanying drawings, in which:

FIGS. 2, 3 and 4A are graphs illustrating the operation of the apparatus of FIG. 1;

FIG. 4B is a partial circuit illustrating a tunnel diode with a series resistor;

FIGS. 6 and 7A are graphs illustrating the operation of the apparatus of FIG. 5; and FIG. 7B is a partial circuit illustrating a tunnel diode and a parallel resistor.

Figure 1:
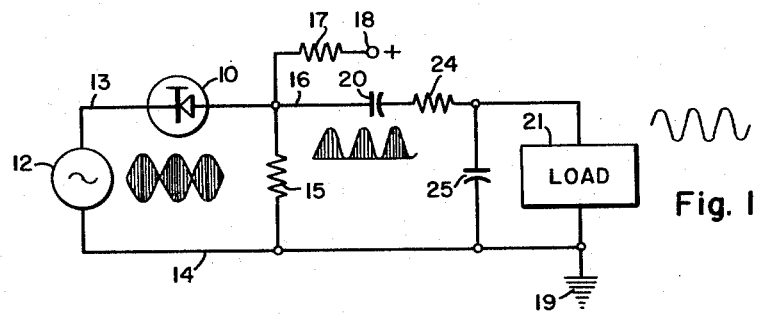
FIGURE 1 is a schematic electrical circuit diagram of apparatus according to the preferred embodiment of the invention.
Figure 2:
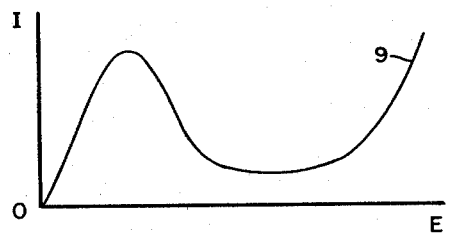
Figure 3:
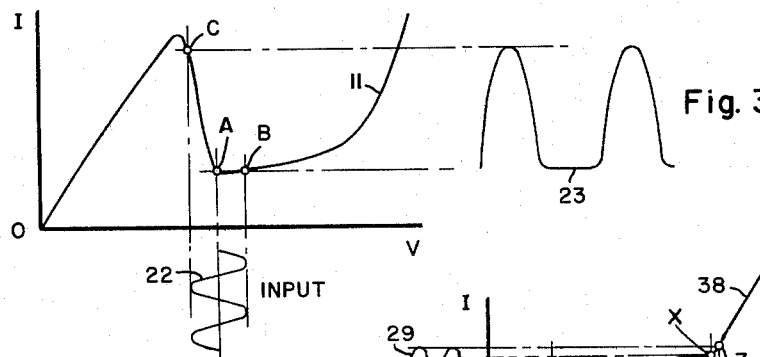

Referring now to the drawings, in which like reference numerals are used throughout to designate like parts, for a more detailed understanding of the invention, and in particular to FIG. 1 thereof, there is shown at 10 a semiconductor diode device characterized by negative resistance over a portion of its voltage-current characteristic curve. The portion of such a characteristic curve lying in the first quadrant is shown in FIG. 2. Such a device has been described in the literature of the art. The characteristics of the device 10 alone while biased in a forward direction may be similar to those shown by the curve 9 of FIG. 2. In FIG. 3, the voltage-current characteristic curve 11 is the modified curve which may result from the addition of the series resistor 15. It is seen that as the voltage increases across the diode 10 in the forward direction, as shown by curve 11, the current through the device increases until a point is reached at which the current begins to decrease and the device assumes a negative resistance. The negative resistance slope portion of the curve includes the portion between points C and A of FIG. 3. A further increase in the voltage causes substantially no increase in current until point B is reached, from which an additional increase in voltage causes a gradual increase in current as the tunnel diode operates over the additional positive resistance portion of its characteristic curve 11, as seen in FIG. 3.

The signal source 12 is seen in FIG. 1 to have one terminal thereof connected to one terminal of diode 10 by lead 13, and the other terminal of source 12 is connected by way of lead 14, resistor 15, and lead 16 to the other terminal of diode 10. Lead 16 is further connected by way of resistor 17 to the positive terminal 18 of a suitable source of direct current biasing potential, not shown, having the other negative terminal thereof connected to ground 19. The lead 16 is further connected by way of coupling capacitor 20 and resistor 24 to one terminal of a suitable output load 21 which may be resistive in nature, the load 21 having the other terminal thereof connected to lead 14 and ground 19. Load 21 has a capacitor 25 of suitable value connected thereacross, the resistor 24 and capacitor 25 providing a low pass filter for eliminating carrier frequency components from the signal developed in the load. Source 12 may supply an amplitude modulated carrier signal, the carrier being of relatively high frequency with respect to the frequency of modulation so that a modulation envelope as shown is provided, and the signal in the load 21 operatively connected across the resistor 15 will be an alternating current signal having a waveform similar to the waveform of the modulation envelope from which the component of carrier frequency has been substantially eliminated.

Particular reference is made now to FIG. 3. The value of the direct current potential from terminal 18 applied to the diode 10, FIG. 1, is selected or adjusted so that the tunnel diode 10 is biased at, for example, point A on its characteristic curve 11 as shown in FIG. 3. Negative voltage swings of the signal from source 12 will then cause a substantial increase in current, while positive voltage swings of the same peak amplitude will cause practically no current increase. Comparing curve 11, FIG. 3, with curve 9, FIG. 2, it is seen that the increase in current for a given voltage swing is made much greater than would occur without a series resistance, providing better detection at low signal levels or larger outputs for the same input signals. The output may be taken either as a current through the load 21, or as a voltage developed across the diode 10. The input signal from source 12 is represented in FIG. 3 by the curve 22, whereas the output signal developed in the load is represented by the curve 23.

In FIGS. 4A and 4B, which further illustrate the operation of the circuit of FIG. 1, the voltage across $R_L$ and the tunnel diode is essentially constant. As the signal shifts the operating point the voltage division varies. At point C the voltage across $R_L$ is a maximum while the voltage across the tunnel diode is a minimum. At point A the reverse is true. The current drawn by the circuit will fluctuate greatly and the voltage across the linear resistor $R_L$ will follow the fluctation. In this arrangement demodulation will take place if the circuit is biased at either point A or point C. At point O no demodulation occurs, and the amplitude of the demodulated output can be controlled by shifting the operating point toward or away from point O.

Figure 5:
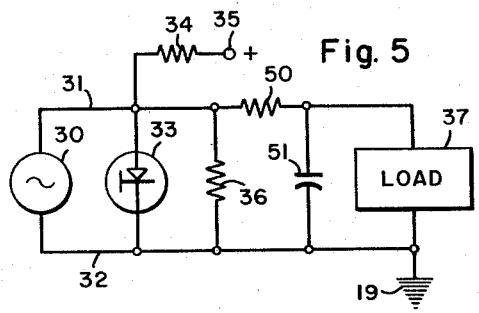
FIG. 5 is a schematic electrical circuit diagram of a second embodiment of the invention.

Particular reference is made now to FIG. 5. A signal source 30 is connected by leads 31 and 32 to the tunnel diode 33, lead 31 being connected by way of resistor 34 to the positive terminal 35 of a suitable source of direct current biasing potential, not shown, having the other negative terminal thereof connected to ground 19. Leads 31 and 32 also connect across the tunnel diode 33 the shunt resistor 36. The output load 37 is connected across leads 31 and 32 by way of resistor 50, which together with capacitor 51 comprises a filter to eliminate components of carrier frequency. It is seen that in FIG. 5 the diode and the load are in parallel.

Figure 6:
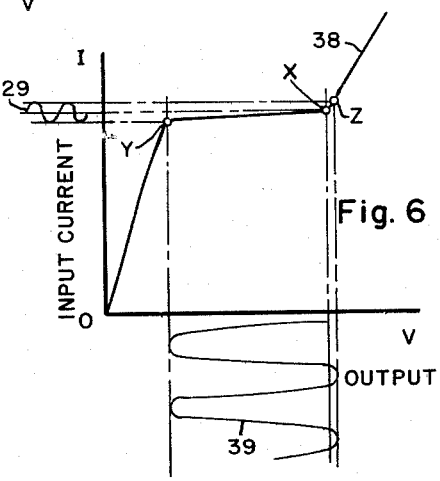

Particular reference is made now to FIG. 6, which shows the characteristic curve of diode 33 shunted by resistor 36 (and load 37). As the input signal 29 swings from X to Z on the modified characteristic curve 38, the diode 33 conducts heavily effectively shorting the output, but as the input signal exemplified by curve 29 swings from point X to point Y the diode current decreases producing a greatly increased current in the load. The output is indicated by the curve 39 of FIG. 6.

In FIGS. 7A and 7B, which further illustrates the operation of the circuit of FIG. 5, the parallel case, the total current is shown with the load resistor and tunnel diode characteristic curves. The current in the range X to Z is substantially constant and is made up of diode current and load resistor current. As the diode current decreases the load resistor current increases. Since the load resistor is linear this corresponds to an increase in voltage across both elements. Demodulation can be obtained by biasing the circuit to either point X or point Z. There will be a reversal of the phase of the detected envelope if the bias point is shifted from X to Z. At point P no detection occurs; amplitude variation for AGC purposes can be obtained by shifting the operating point toward or away from point P.

The circuit of FIG. 1 is especially suitable for voltage sources, while the circuit of FIG. 5 is suitable for use with current sources, and the mount of gain obtained is limited only by the required stability of the detector apparatus.

The invention includes the use of chokes of inductances, or other filters, if and where desired, to aid in suppressing the carrier frequency.

In the embodiment of FIG. 5, a capacitor may be connected between resistor 50 and lead 31, if desired.

In summary, the invention employs a tunnel diode having a signal to be demodulated applied thereto, with means for biasing the diode near the top or bottom of the negative resistance slope portion of the voltage-current characteristic curve, and having a resistor operatively connected to the diode for developing a signal which is delivered to an output load.

Whereas the invention has been shown and described with respect to some embodiments thereof which give satisfactory results, it should be understood that changes may be made and equivalents substituted without departing from the spirit and scope of the invention.

I claim as my invention:

1. A signal demodulator comprising a tunnel diode having a voltage-current characteristic with a first and a second positive conductance portion joined by a negative conductance portion, signal circuit means including a resistor having a positive substantially linear characteristic connected to said tunnel diode for applying across the latter an alternating current signal to be detected additional circuit means including said resistor for applying a biasing potential to bias said diode at the lower extremity of said negative conductance portion adjacent said second positive conductance portion of said voltage-current characteristic, low pass filter means connected to said tunnel diode, and load means operatively connected to said low pass filter means whereby an alternation of one polarity of the signal causes a small change in the current in said diode and substantially no signal to be developed in said load means, and an alternation of the opposite polarity of the signal causes a change in the current through said tunnel diode large relative to the change in current in the opposite direction and causing a substantial signal in said load means.

2. A signal demodulator comprising a tunnel diode having a voltage-current characteristic with a first and a second positive conductance portion joined by a negative conductance portion, signal circuit means including a resistor having a positive substantially linear characteristic connected in series with said tunnel diode for applying across the latter an alternating current signal to be detected, additional circuit means including said resistor for applying a biasing potential to said diode at the lower extremity of said negative conductance portion adjacent said second positive conductance portion of said voltage-current characteristic, low pass filter means connected to said tunnel diode, and load means operatively connected to said low pass filter means whereby an alternation of one polarity of the signal causes a small change in the current in said diode and substantially no signal to be developed in said load means, and an alternation of the opposite polarity of the signal causes the change in the current through said tunnel diode large relative to the change in current in the opposite direction and causing a substantial signal in said load means.

3. A signal demodulator comprising a tunnel diode having a voltage-current characteristic with first and second positive conductance portions joined by a negative conductance portion, signal circuit means including a resistor having a positive substantially linear characteristic connected in parallel with said tunnel diode for applying across the latter an alternating current signal to be detected, additional circuit means including said resistor for applying a biasing potential to bias said diode at the lower extremity of said negative conductance portion and adjacent said second positive conductance portion of said voltage-current characteristic, low pass filter means connected to said tunnel diode, and load means operatively connected to said low pass filter means whereby an alternation of one polarity of the signal causes a small change in the current in said diode and substantially no signal to be developed in said load means, and an alternation of the opposite polarity of the signal causes a change in the current through said tunnel diode large relative to the charge in current in the opposite direction and causing a substantial signal in said load means.

References Cited by the Examiner

UNITED STATES PATENTS

| | | | |
|---|---|---|---|
| 2,966,599 | 12/60 | Haas | 307—88.5 |
| 2,978,576 | 4/61 | Watters | 307—88.5 |
| 3,061,786 | 10/62 | Theriault | 307—88.5 |
| 3,075,088 | 1/63 | Li | 307—88.5 |
| 3,119,072 | 1/64 | Sommers | 329—205 X |
| 3,119,080 | 1/64 | Watters | 329—205 X |
| 3,134,949 | 5/64 | Tiemann | 307—88.5 |

FOREIGN PATENTS 158,879 9/54 Australia.

OTHER REFERENCES

Electronics (I), "The Tunnel Diode-Circuits and Applications," Nov. 27, 1959, pages 60–64.

Electronics (II), "Tunnel-Diode Pulse Compressor Preserves Superimposed Signal," March 24, 1961, pages 36–39.

RCA TN No. 356, June 1960, Huo-Bing Yin.

ROY LAKE, *Primary Examiner.*

ROBERT H. ROSE, GEORGE N. WESTBY, *Examiners.*